United States Patent [19]

Maly

[11] Patent Number: 5,676,394
[45] Date of Patent: Oct. 14, 1997

[54] SEAT TRIM DEPLOYMENT COVER FOR SIDE AIRBAG MODULE

[75] Inventor: Timothy M. Maly, Plymouth, Mich.

[73] Assignee: Morton International, Inc., Chicago, Ill.

[21] Appl. No.: 706,815

[22] Filed: Sep. 3, 1996

[51] Int. Cl.⁶ .......................... B60R 21/16; B60R 21/22
[52] U.S. Cl. ........................ 280/728.3; 280/730.2
[58] Field of Search ...................... 280/730.2, 730.1, 280/728.3, 728.1, 732, 731

[56] References Cited

U.S. PATENT DOCUMENTS

| | | | |
|---|---|---|---|
| 5,433,473 | 7/1995 | Hiramitsu et al. | 280/728.3 |
| 5,498,030 | 3/1996 | Hill et al. | 280/743.1 |
| 5,499,840 | 3/1996 | Nakano | 280/730.2 |
| 5,556,127 | 9/1996 | Hurford et al. | 280/730.2 |
| 5,556,129 | 9/1996 | Coman et al. | 280/730.2 |
| 5,564,733 | 10/1996 | Duenas et al. | 280/732 |

*Primary Examiner*—Eric D. Culbreth
*Attorney, Agent, or Firm*—George W. Rauchfuss, Jr.; Gerald K. White

[57] ABSTRACT

A side airbag deployment system having a rubber or plastic deployment cover with a tear seam therein, with the deployment cover being secured in the seat finish trim fabric at a location of the intended path of deployment of an inflatable airbag from an airbag module secured to a rigid seat frame member.

10 Claims, 3 Drawing Sheets

SEAT TRIM DEPLOYMENT COVER FOR SIDE AIRBAG MODULE

FIELD OF THE INVENTION

This invention relates to a deployment cover in the seat trim fabric for deployment of a side airbag module enclosed within the upholstery of a vehicle seat. More particularly, the invention relates to a deployment cover in the surface of the seat trim fabric for ensuring consistency of side airbag deployment at a predetermined location through the seat back foam and trim fabric.

BACKGROUND OF THE INVENTION

Airbag modules are conventionally employed in motor vehicles to protect vehicle occupants in the event of a rapid deceleration or collision. While such airbag modules have generally been employed within the steering wheel or behind the passenger side instrument panel, it has now become apparent that it is desirable to employ side airbags mounted in close proximity to the vehicle occupant in the vehicle doors or passenger seats, for example, in order to more fully protect vehicle occupants from side impact collisions. It has been suggested that a highly desirable location for a side airbag is to be mounted on an internal frame of seat.

An airbag module typically contains a rigid or semi-rigid container-type housing which is anchored to a vehicle body and which houses an inflator and folded airbag. When such an airbag module is a side impact airbag module mounted on a frame member within a vehicle seat, it is generally necessary for the airbag module to be mounted on the seat frame member in a manner so that it not approach too closely to the seat surface. Otherwise the housing or module cover may cause rigid or stiff points in the seat surface which are not desirable from the standpoint of seating comfort of the seat occupant. Deployment is normally intended to be through a frangible seam in the seat between the front and side panels of the seat back. However, when such a side airbag module is mounted away from the finish surface of the seat, deployment consistency and deployment location become problematic. Yet, for safe and effective usefulness of such side airbags and adequate protection of vehicle occupants, it is necessary for the airbag deployment to be consistent at a predetermined location on the seat surface.

It is therefore an object of this invention to provide an internally mounted side airbag module which produces consistent airbag deployment at a predetermined location on the seat trim surface.

SUMMARY OF THE INVENTION

A means for providing consistent airbag deployment at a predetermined location in a vehicle seat is provided by means of a rubber or plastic deployment cover within the fabric outer side trim or finish surface of a vehicle seat and with said deployment cover defining a tear seam for deployment of the airbag through the deployment cover in the seat fabric.

BRIEF DESCRIPTION OF THE DRAWINGS

The invention, together with further objects, features, advantages and aspects thereof, will be more clearly understood from the following description taken in connection with the accompanying drawings.

DETAILED DESCRIPTION OF THE INVENTION

Figure 1:
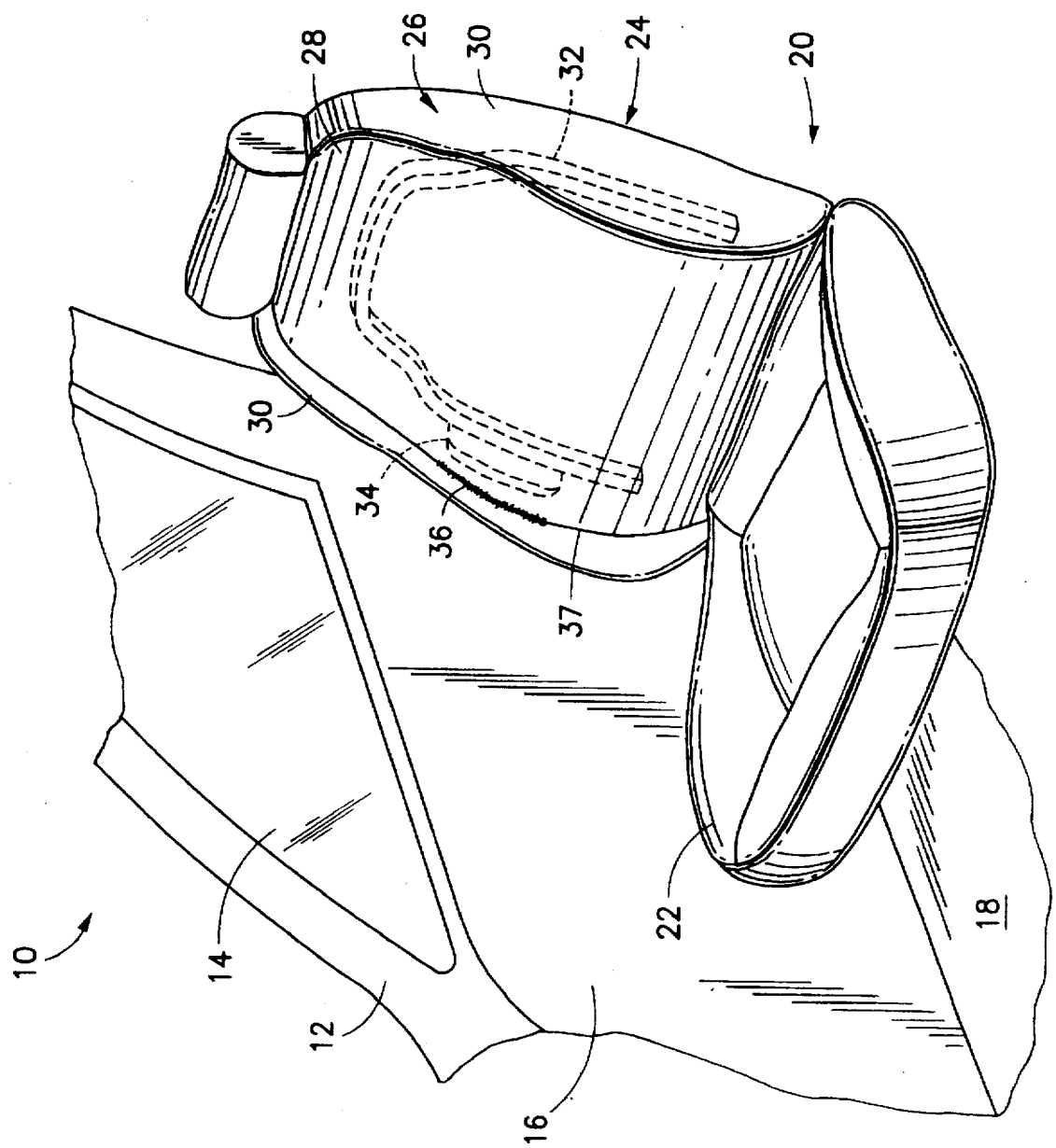
FIG. 1 is a perspective view of a vehicle interior, partially broken away, showing a typical prior art installation of a side impact airbag module in a vehicle seat.
Figure 2:
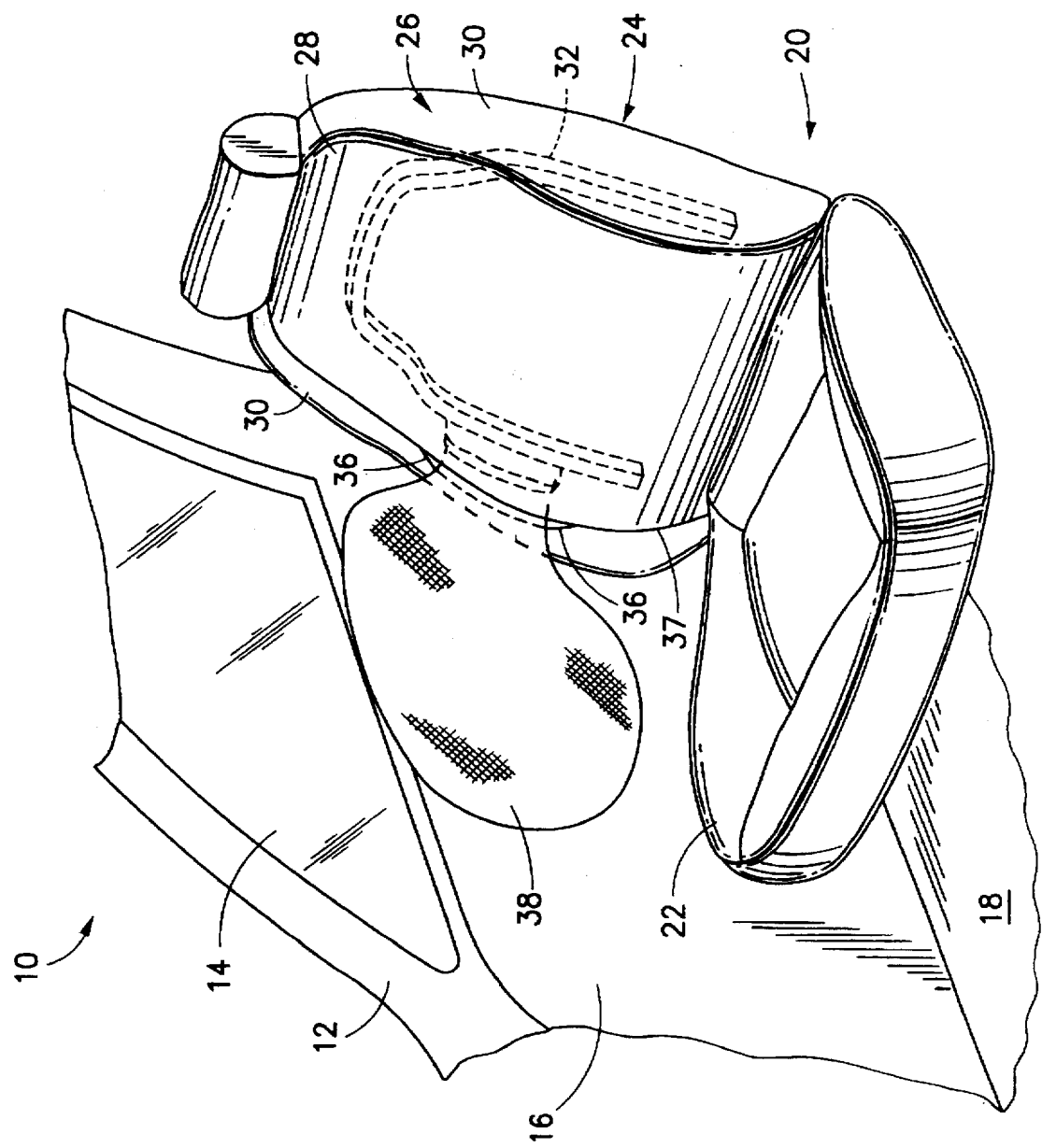
FIG. 2 is a view similar to FIG. 1 but showing the airbag of the prior art installation in a deployed condition.

A typical prior art installation for an airbag module mounted in a vehicle seat is shown in FIGS. 1 and 2. A vehicle 10 includes a door 12 having a window 14 and an inner door panel 16. The interior 16 of the vehicle includes a vehicle seat 20 having a seat bottom portion 22 and a seat back portion 24 extending upwards from the bottom portion. The seat back portion 24 includes a foam cushion portion 26 covered by fabric outer front trim surface 28 and fabric outer side surfaces 30. Internally within the seat back portion 24 is a rigid seat frame member 32 to which is secured an airbag module 34 generally comprising an inflator (not shown) and an inflatable airbag 38. A rupturable seam 36 is provided in the vehicle seat 20 generally at juncture 37 in the fabric of the outer front trim surface 28 with one of the outer side trim surface 30. Upon deployment and inflation of the airbag 38 it is intended for the inflating airbag to cause rupture of seam 36 so that the airbag deploys as shown in FIG. 2. However, in practice, consistent and reliable deployment of such a side airbag through the rupturable seam 36 is problematic and often not obtained.

Figure 3:
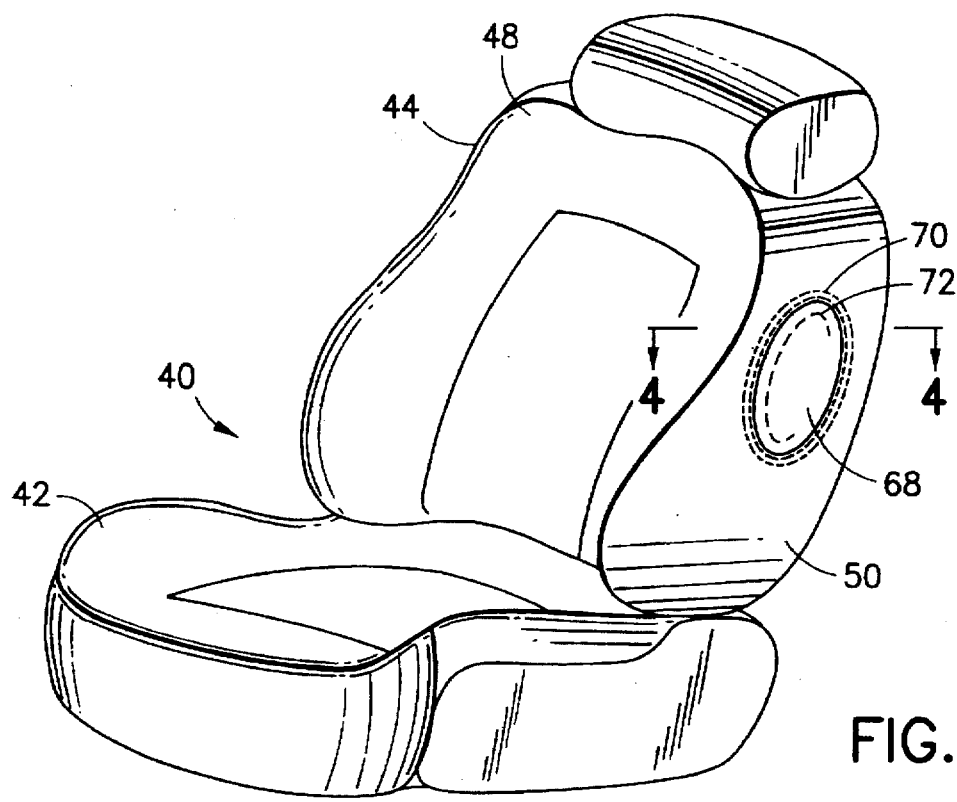
FIG. 3 is a side view of a vehicle seat employing the deployment cover of this invention.
Figure 4:
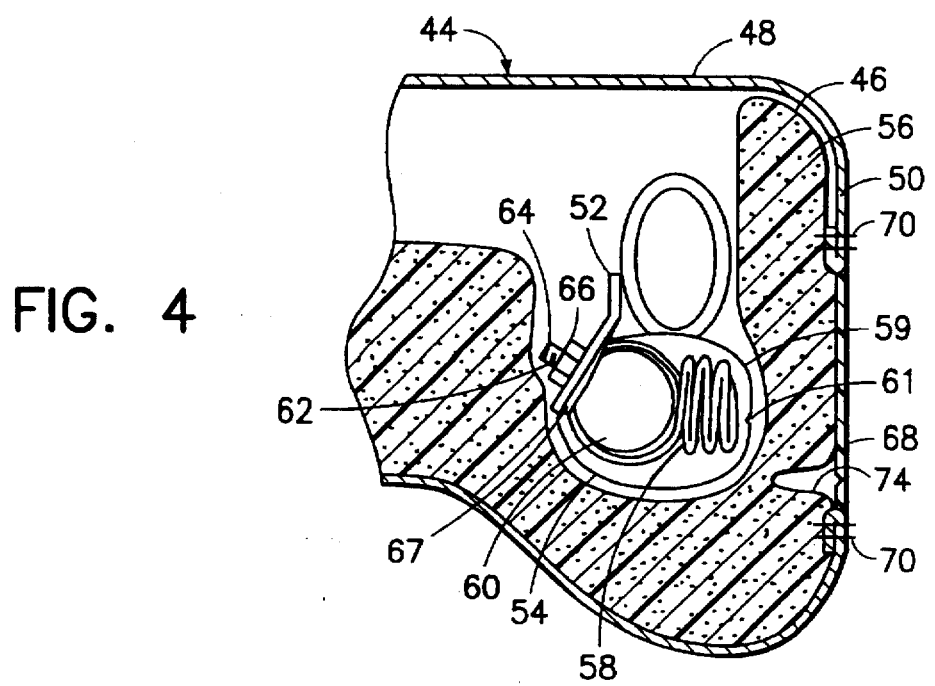
FIG. 4 is a partial cross-sectional view along line 4—4 of FIG. 3 showing the side airbag system of this invention.

In accordance with the present invention a more consistent and reliable deployment of a side airbag mounted internally within a vehicle seat is obtained by providing an appropriate deployment cover in the fabric trim side surface of the seat back. A suitable embodiment of such a deployment cover is illustrated in FIGS. 3 and 4. FIG. 3 shows a vehicle seat 40 generally similar to the type of seat shown in FIGS. 1 and 2. Vehicle seat 40 includes seat bottom portion 42 and a seat back portion 44 extending upwardly from the seat bottom portion. The seat back portion 44 includes a foam cushion portion 46 covered by a fabric outer trim front surface 46 and fabric outer side surfaces 50. Internally within the seat back portion 44 is a rigid seat frame member 52, generally a metal tubular member, to which is secured an airbag module 54 comprising an inflator 60 having inflation ports (not shown) and an inflatable airbag 58 within a module housing 59. If necessary the module housing 59 will have an appropriate tear seam 61 formed therein. The airbag module 54 is mounted to frame member 52 by way of elongated mounting studs 62 associated with inflator 60 and having a threaded end 64 for receiving a nut 66 therein after passing through the frame member. If necessary to obtain proper orientation of the airbag module 54 within the seat back portion 44 a positioning shim 67 may be employed between the module and frame member 52. Generally the internal portion of seat back portion 44 is filled with a suitable foam 56, such as polyurethane foam, to provide the foam cushion portion 46.

Within one of the fabric outer side surfaces 50 a suitable rubber or plastic deployment cover 68 is secured. The deployment cover 68 is attached to the fabric side surface 50 by any suitable non-rupturable means 70, preferably by means of non-rupturable stitching around the periphery of the deployment cover. Deployment cover 68 is provided with a suitable tear seam 72, preferably a hidden tear seam, i.e. one that is externally invisible to a vehicle occupant. Preferably the tear seam is formed as a C-shaped hidden tear seam as shown in FIG. 3. It is also desirable that the interior foam 56 of the seat back portion 44 be provided with perforations in the foam to provide a perforated rupture line 74 producing a defined pathway of the inflating airbag through the foam to the deployment cover.

The deployment cover is made of any suitable rubber or thermoplastic polymer and is generally of a thickness to permit stitching of the cover to the outer fabric 50 of the seat. It will be appreciated that the rubber or plastic to be chosen will be aesthetically pleasing and complimentary to the finish fabric 50 of the seat back. A suitable thermoplastic is a thin polypropylene cover of a suitable color to match the seat fabric.

Upon actuation of the airbag 58 the inflating airbag breaks through housing 59 at tear seam 61 and progresses through foam portion 56 along perforated rupture line 74 to deployment cover 68 where it ruptures tear seam 72 of the cover and deploys through the seat at the desired predetermined location.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. In a vehicle seat for attachment of an inflatable airbag from an airbag module secured to a rigid seat frame member and intended for deployment through a finish trim fabric of said seat, the improvement comprising:

said seat finish trim fabric having a rubber or plastic deployment cover having a periphery non-rupturably secured to said trim fabric at a location of intended deployment of the inflatable airbag, with said deployment cover a tear seam therein.

2. A vehicle seat according to claim 1 wherein the tear seam in the deployment cover is invisible externally of the seat.

3. A vehicle seat according to claim 1 wherein the deployment cover is a plastic cover and defines a generally C-shaped tear seam.

4. A vehicle seat according to claim 1 wherein the deployment cover is secured to the fabric of the seat by non-rupturable stitching.

5. A vehicle seat according to claim 4 wherein the seat is internally filled with foam and said foam defines a perforated rupture line for deployment of the airbag through the foam to the deployment cover.

6. A side airbag deployment system comprising:

a vehicle seat having a seat bottom portion and a seat back portion and a rigid seat frame member internally within said seat back portion; said seat back portion comprising a foam cushion having an outer fabric front surface and outer fabric side surfaces;

an airbag module comprising an inflatable airbag and an inflator for inflating said airbag through a mouth of said airbag secured to said inflator; said airbag module secured to the rigid seat frame member and oriented for deployment through said foam cushion and one of said outer fabric side surfaces of the seat back portion of the vehicle seat; and a rubber or plastic deployment cover having a periphery non-rupturably secured one of said outer fabric side surfaces at a location in an intended deployment path of the airbag; said deployment cover defining a tear seam therein.

7. A side airbag deployment system of claim 6 wherein the tear seam in the deployment cover is invisible externally of the seat.

8. A side airbag deployment system of claim 7 wherein the deployment cover is a plastic cover and defines a generally C-shaped tear seam.

9. A side airbag deployment system of claim 7 wherein the deployment cover is secured to the outer fabric side surface by non-rupturable stitching.

10. A side airbag deployment system of claim 9 wherein said foam cushion defines a perforated rupture line in said foam cushion for deployment of the airbag through the foam cushion to the deployment cover.

* * * * *